UNITED STATES PATENT OFFICE.

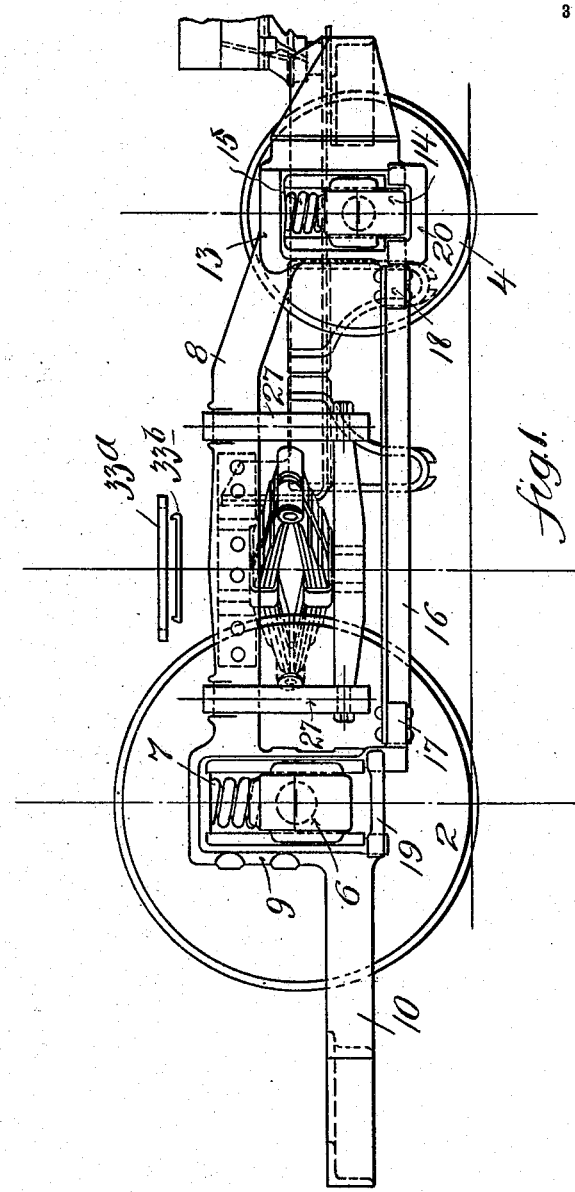

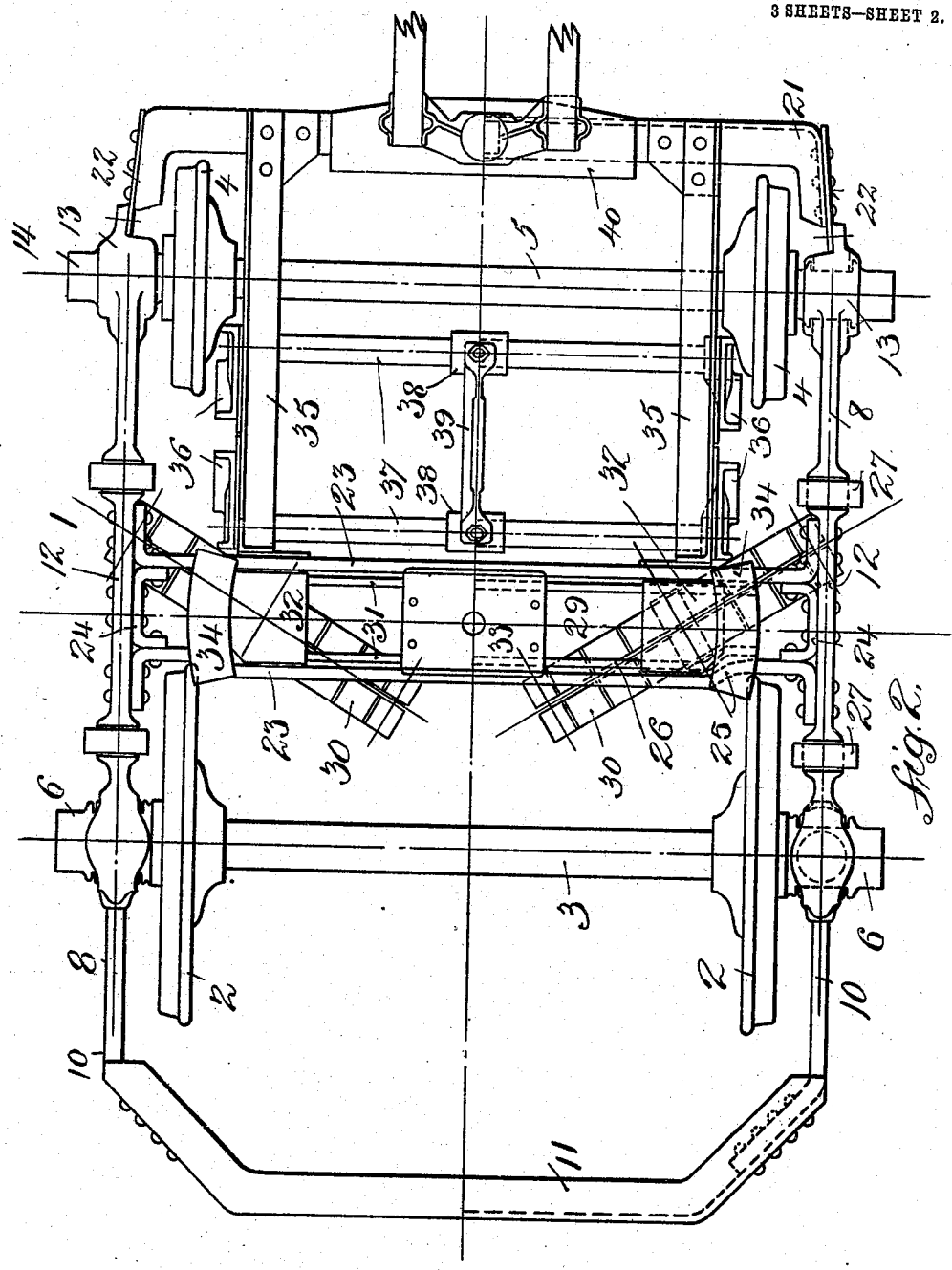

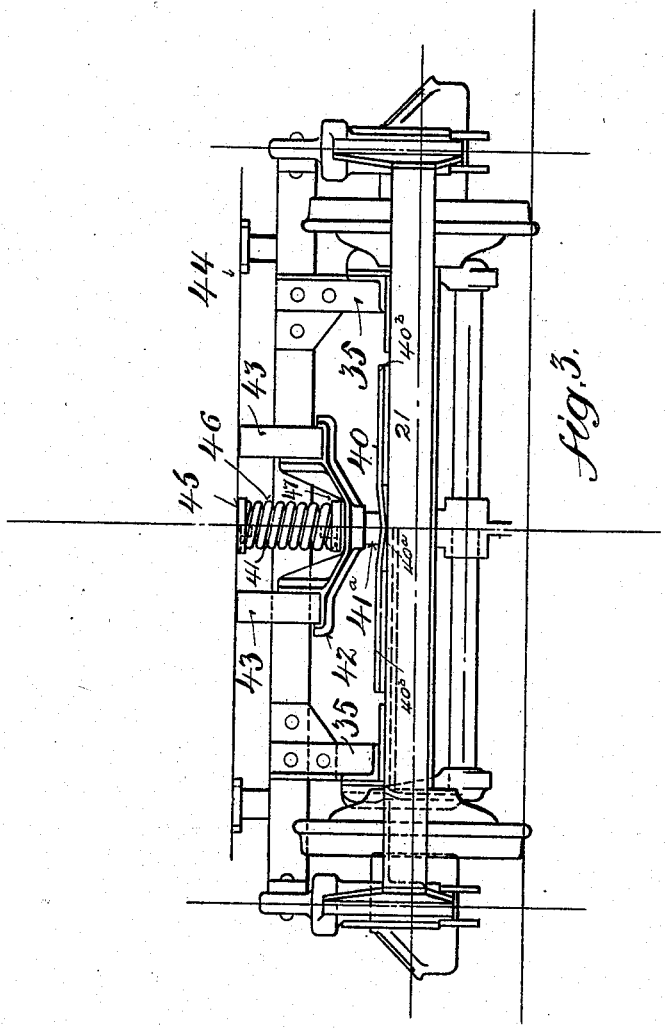

WALTER S. ADAMS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

MAXIMUM-TRACTION TRUCK.

No. 919,803.     Specification of Letters Patent.     Patented April 27, 1909.

Application filed June 20, 1908. Serial No. 439,538.

*To all whom it may concern:*

Be it known that I, WALTER S. ADAMS, a citizen of the United States, and a resident of the city and county of Philadelphia, State of Pennsylvania, have invented a new and useful Improvement in Maximum - Traction Trucks, of which the following is a specification.

In an application filed by me June 19th, 1908, Ser. No. 439,433, I have shown, described and claimed a novel construction in maximum traction trucks.

The improvements set forth in this application have for their object the production of a truck of the maximum traction type which can be with increased facility and certainty of operation used with the small wheels leading; and to that end the specific improvements embodied herein consists in providing a car truck of the type disclosed in my said co-pending application, with a weight shifting and self-centering end-bearing, the result of the use of which being that on a straight track the end bearing will tend to preserve the truck and car in parallelism, and at the same time, tend to keep the small or leading wheels down on the track with the pressure thereon that they have been designed to bear, and when the truck leaves a straight track and takes a curve the smaller wheels will be pressed down by a spring action graduating the pressure to the particular requirements and always placing it upon the outside wheels.

For a more particular description of my invention reference is to be had to the accompanying drawings forming a part hereof, in which:

Figure 1 is a side elevation of a truck embodying my improvements together with a portion of the car necessary to coöperate therewith. Fig. 2 is a plan view of this structure. Fig. 3 is an end elevation of the structure shown in the other figures.

Throughout the various views of the drawings, similar reference characters designate similar parts.

My improvements may be applied to any form of truck of this type especially adapted and organized to receive them, but I prefer employing them in connection with the special form of truck shown herein and which forms the subject matter of my application hereinabove referred to.

My improved truck 1 is provided with large driving wheels 2 connected with an axle 3 and the similar wheels 4 are connected by an axle 5. The axle 3 is journaled in suitable axle boxes which carry the usual axle box springs 7 which in turn support the side frame 8 of the truck 1. Each side frame 8 is provided with a suitable pedestal 9 in which the axle box 6 has vertical movement and projecting from one pedestal leg 9 and at the lower end thereof is an arm 10 bent inwardly at substantially 45 degrees near its free end and there joined to an angle crossing 11 of the conventional type, which crossing 11 supports one end of the motor, not shown, and unites the side frame 8.

The leg of the pedestals 9 opposite the legs to which the arms 10 are attached is provided at its upper ends with top chords 12 which extend to the pedestals 13 in which the axle boxes 14 slide, and the axle boxes 14 are provided with the usual axle box springs 15 by which the pedestals 13 are supported. The axle boxes 14 have the axle 5 journaled therein. As the wheels 4 have a smaller diameter than the driving wheels 2, the top chord has to be bent downwardly in a vertical plane, as shown in Fig. 1, to compensate for this difference in diameter. The pedestals 9 and 13 are also united by suitable tie-bars 16 which are secured to suitable lugs 17 and 18 projecting from the pedestals 9 and 13 respectively. The lower ends of the legs of the pedestals are also united by the usual connections 19 and 20 respectively. The pedestals 13 are also united by a crossing 21 secured to webs 22 integral with or fixed to the pedestal 13. The top chords 12 are also united by means of transoms 23 secured in any suitable manner and spaced apart by U-plates 24 which are also secured to the top chords 12. One of the transoms 23 is straight, except at its ends where it is bent at right angles so that it can be secured to the top chords 12 and the other transom 23 is slightly bent at 25 as shown in dotted lines in Fig. 2 so as to permit a larger bolster 26 to be employed and the bolster to be brought nearer the driving wheels 2.

The bolster 26 is supported in the following manner. Stirrups 27 which are hung from the chords 12, two from each chord, and these stirrups 27 which are hung from the same chord are connected by an equalizing bar 28 and the bars 28 are united by a sand plank 29 on which the diagonally disposed elliptical springs 30 are mounted. These springs 30 support the bolster 26 in the conventional manner.

The bolster 26 may be made in any suitable form and is preferably provided with side bars 31 united by the end blocks 32 and the center block 33 through which the king bolt passes. The end blocks 32 also support suitable side rub plates 34 of the conventional form and mounted in the conventional manner.

The transom 23 adjacent to the trailing wheels 4 is connected with the crossing 21 by suitable angle metal bars 35 secured in any suitable manner and from which are suspended suitable brackets 36 which are joined by rods 37 on which are sliding collars 38 which carry the plow 39 through which electricity is carried to the car. It is obvious that where an over head trolley is to be used instead of a plow, this plow 39 and its supporting means may be omitted.

To provide means for shifting the proportioned weight of the car on the outside wheel of the small pair 4 when the truck is curving, and at the same time provide efficient means for keeping those wheels down on the track by the application of a pre-determined amount of pressure thereon, I employ the following construction.

The crossing 21 is provided with a plate 40 having a centrally beveled angular depression 40$^a$, the extensions of the plate beyond the depression and at both sides being preferably horizontal as at 40$^b$. At 41 is shown a spring-pressed plunger having a squared head 41$^a$ passing through a squared aperture in the bracket 42. The operative end of the plunger head is angularly formed to coincide with the depression 40$^a$ in the plate 40. The plunger 41 is supported by the bracket 42 suitably secured to short sills 43 which are in turn secured to the car body 44. At 45 is a cap secured to the lower side of the car body in any suitable manner, against which bears a coil-spring 46 resting on its lower end in the spring cup 47 which may be either integral with the plunger or fixed to it in any suitable manner, the spring 46 encircling the upper end of the same.

When on a tangent or curve, the spring presses the inclined head of the plunger into the inclined surface of the depression in the plate 40 with a predetermined amount of pressure; the coöperation of the spring in the two inclined surfaces tending to keep the union of the car and the truck more stable while on the tangent; and when a curve is reached the plunger head will be forced out of the depression against the stress of the spring and will move out toward the outer rail, bringing additional pressure upon the outer of the smaller wheels. By this construction I am enabled to use the smaller wheels as pilot wheels, instead of using them, as has been the prevailing practice, as trailing wheels. By using them as leading or pilot wheels I am enabled to locate them closer to the platforms and do away with the high placing of the car body, thereby reducing the height of the steps and avoid cutting away the sills, or of side running boards in open cars, the reduction of the height of the truck frame and the wheels at the leading ends being such as to enable the truck to swing clear underneath the car at those points without interference.

While I have shown and described one embodiment of my invention, it is obvious that it is not restricted thereto but covers all structures that come within the scope of the annexed claims.

Having described my invention, what I claim is:

1. In a car truck, the combination with the truck frame, large driving wheels and smaller wheels, means for providing a pivotal connection between the truck and the car body supported by the truck eccentrically with relation to the driving wheels, a crossing extending between the side pieces of the truck frame adjacent the smaller wheels, a plate having a central depression secured to the said crossing, the depression being in line with the longitudinal center of the truck, a spring-pressed plunger provided with a head having an angular operating face adapted to engage the angular depression in said plate and disposed over the said plate and means for connecting said plunger with a car body.

2. In a car truck having a frame and large driving wheels and smaller wheels, a pivotal center located adjacent the driving wheels, a crossing extending between the side pieces of said truck frame located beyond the said smaller wheels, a cam plate fixed to said crossing having a depression in line with the longitudinal center of the truck, a spring-pressed plunger disposed over the cam-plate having an operative face adapted to engage said depression, and means for connecting said plunger with a car body.

3. In a car truck, the combination with the truck frame, large driving wheels and smaller wheels, a cross bolster supported by the truck frame eccentrically with relation to the driving wheels, means for pivotally connecting a car body with said bolster, a crossing extending between the side members of said frame outside of the small wheels, a plate supported on said crossing having a central depression in line with the longitudinal center of the truck, a spring-pressed plunger provided with a head having an annular operating face adapted to engage the annular depression in said plate, and disposed over said plate, and means for connecting said plunger with a car body.

4. In a car truck having a frame and large driving wheels and smaller wheels, a cross bolster supported by said frame eccentrically with relation to the driving wheels and carrying means for pivotally connecting it with a car body, a crossing extending between the side pieces of said truck frame located beyond said smaller wheels, a cam plate fixed to said crossing having a depression in line with the longitudinal center of the truck, a spring-pressed plunger disposed over the cam plate and having an operative face adapted to engage said depression, and means for connecting said plunger with a car body.

5. In a device of the class described, means for connecting a truck and car body comprising in combination a car provided with suitable sills 43, a bracket 42 secured to said sills, a cap 45 secured to the lower side of the car, a plunger 41 provided with a cup, a spring 46 between the cap 45 and cup 47, a car truck having a frame and a crossing, and a cam plate 40 provided with a centrally located angular depression 40$^a$ for engagement with the angular face of the plunger 41$^a$.

Signed at the city and county of Philadelphia, State of Pennsylvania, this 18th day of June, 1908.

WALTER S. ADAMS.

Witnesses:
WM. M. LLOYD, Jr.,
TERRENCE MCCUSKER.